US012059584B2

(12) United States Patent
Boulliat et al.

(10) Patent No.: US 12,059,584 B2
(45) Date of Patent: Aug. 13, 2024

(54) PORTABLE POWER-DRIVEN SYSTEM

(71) Applicant: Skylotec GmbH, Neuwied (DE)

(72) Inventors: Claude Boulliat, Grenoble (FR); Jimmy Eiterjord, Västra Frölunda (SE)

(73) Assignee: SKYLOTEC GMBH, Neuwied (DE)

( * ) Notice: Subject to any disclaimer, the term of this patent is extended or adjusted under 35 U.S.C. 154(b) by 255 days.

(21) Appl. No.: 17/601,754

(22) PCT Filed: Apr. 9, 2020

(86) PCT No.: PCT/SE2020/050373
§ 371 (c)(1),
(2) Date: Oct. 6, 2021

(87) PCT Pub. No.: WO2020/209783
PCT Pub. Date: Oct. 15, 2020

(65) Prior Publication Data

US 2022/0193461 A1 Jun. 23, 2022

(30) Foreign Application Priority Data

Apr. 9, 2019 (SE) .................................... 1950443-0

(51) Int. Cl.
*A62B 1/06* (2006.01)
*B66D 1/12* (2006.01)
*B66D 1/74* (2006.01)

(52) U.S. Cl.
CPC .................. *A62B 1/06* (2013.01); *B66D 1/12* (2013.01); *B66D 1/7415* (2013.01); *B66D 1/7489* (2013.01)

(58) Field of Classification Search
CPC .. B66D 1/7415; B66D 1/7426; B66D 1/7447; B66D 1/7489; B66D 1/12; B66D 1/365; B66D 3/04; B66D 3/20; B66D 2700/0141; A62B 1/06; A62B 1/10; A62B 1/14
USPC .......................................................... 254/362
See application file for complete search history.

(56) References Cited

U.S. PATENT DOCUMENTS

| | | | | |
|---|---|---|---|---|
| 3,375,725 | A * | 4/1968 | Mathison | F16H 55/38 474/164 |
| 4,434,973 | A | 3/1984 | Desplats | |
| 6,412,602 | B1 | 7/2002 | Sundman | |
| 7,137,481 | B2 * | 11/2006 | Petzl | A62B 1/10 188/65.1 |
| 7,513,334 | B2 * | 4/2009 | Calver | B66D 1/7415 182/133 |
| 7,658,264 | B2 * | 2/2010 | Mauthner | B66D 3/046 182/5 |

(Continued)

FOREIGN PATENT DOCUMENTS

| | | |
|---|---|---|
| DE | 4328210 | 9/1994 |
| GB | 2362365 | 11/2001 |

(Continued)

OTHER PUBLICATIONS

PCT International Search Report & Written Opinion for corresponding PCT Application No. PCT/SE2020/050373, mailed on May 15, 2020, 12 pages.

*Primary Examiner* — Michael R Mansen
*Assistant Examiner* — Henrix Soto
(74) *Attorney, Agent, or Firm* — Dority & Manning, P.A.

(57) ABSTRACT

A portable power-driven system, such as an ascender/descender arrangement, ensures that a rope used in relation to the portable power-driven system is securely handled when in an operational state.

18 Claims, 6 Drawing Sheets

(56) References Cited

U.S. PATENT DOCUMENTS

| | | | | |
|---|---|---|---|---|
| 9,358,408 | B2 * | 6/2016 | Hua | A62B 1/06 |
| 9,790,064 | B2 * | 10/2017 | Timmermans | A63B 29/00 |
| 10,023,445 | B2 * | 7/2018 | Boulliat | B66D 1/7489 |
| 2008/0203370 | A1 * | 8/2008 | Ball | B66D 1/7494 254/372 |
| 2011/0204306 | A1 * | 8/2011 | Kingery | B66D 3/046 254/391 |
| 2012/0193166 | A1 * | 8/2012 | Rogelja | A62B 1/14 182/5 |
| 2015/0123058 | A1 | 5/2015 | Melin et al. | |
| 2017/0107086 | A1 | 4/2017 | Boulliat | |
| 2018/0147421 | A1 * | 5/2018 | Ogura | A62B 1/06 |

FOREIGN PATENT DOCUMENTS

| | | | | |
|---|---|---|---|---|
| WO | WO 2010/049597 | | 5/2010 | |
| WO | WO-2010049597 | A1 * | 5/2010 | A62B 1/14 |
| WO | WO-2012157954 | A9 * | 2/2013 | A62B 1/06 |
| WO | WO-2015156695 | A1 * | 10/2015 | B66D 1/7489 |

* cited by examiner

PORTABLE POWER-DRIVEN SYSTEM

CROSS-REFERENCE TO RELATED APPLICATIONS

This application is a U.S. national phase entry of International Application number PCT/SE2020/050373 filed on Apr. 9, 2020, which, in turn, is based upon and claims the benefit of priority from prior Swedish Application number 1950443-0 filed on Apr. 9, 2019, the entire contents of both of which are incorporated herein by reference.

TECHNICAL FIELD

The present invention relates to a portable power-driven system, such as an ascender/descender arrangement, specifically in relation to means for ensuring that a rope used in relation to the portable power-driven system is securely handled when in the operational state.

BACKGROUND OF THE INVENTION

Powered personal lifting devices assist personnel in scaling vertical surfaces. Motorized winches are used to raise or lower personnel on platforms or harnesses attached to ropes. A winch must be anchored to a solid platform above the load or use pulleys coupled to the platform to hoist the load. Further, a winch winds the rope or cable on a spool which limits the length and weight of rope that can be used. Hoists, usually with compound pulleys or reducing gears are used to raise or lower individuals or platforms and must be suspended from a secure support point such as a tripod, beam or bridge crane. Typically, a winch or hoist requires at least a second person to operate or control the device in order for a first person to safely ascend a rope.

There are however many examples of where it would be desirable to have access to a portable winch, preferable for a portable winch that can be operated by the person ascending or descending the rope. Such scenarios include for example mountain climbing, caving, tree trimming, rescue operations and military operations. Industrial uses of a climbing device may include scaling tall structures, towers, poles, mine shafts or bridge works for servicing, cleaning, window washing, painting, etc.

An example of such a portable winch is disclosed in U.S. Pat. No. 6,412,602. In U.S. Pat. No. 6,412,602 there is provided a promising approach to a portable climber operated winch, denoted as a climbing device, comprising a rotatable rope pulley connected to a motor, such as for example an internal combustion motor or an electric battery powered motor. When in the operational state of the climbing device a rope is introduced in the rope pulley, and once the motor is engaged and starts to rotate, the rope pulley may advance the climber in a typically vertical direction along the rope.

Even though the above-mentioned prior art shows a very useful solution for rope access to heights, there is always an endeavor to introduce further improvements for the personnel utilizing the equipment. Specifically, there is a desire to minimize any risks when working at heights, thereby improving the environment for the user of such equipment.

SUMMARY OF THE INVENTION

According to a first aspect of the invention, the above is at least partly alleviated by a portable power-driven system for advancing a rope, the rope extending in a first main direction, the power-driven system comprising a motor comprising a drive shaft, a rope grab connected to the drive shaft, the rope grab comprises a rope engaging face adapted to, when in an operational state, engage the rope along a first section of a circumference of the rope grab, and a main body for mounting the motor and further comprising an anchoring point adapted to receive an anchoring force, the anchoring force extending in a second direction being essentially opposite to the first main direction, wherein the power-driven system further comprises a rope securing arrangement, the securing arrangement comprising an elongated lever at a first end having a hinged connection to the main body and at a second end configured to receive a first roller adapted to, when in the operational state, engage with the rope, and the rope securing arrangement is adapted to, by means of a second roller comprised with the elongated lever, exert a pressure to the rope for forcing the rope towards the rope grab at a portion of the first section where the rope, when in the operational state, is engaging the rope grab.

The invention is based on the understanding that the operation of the portable power-driven system may be simplified in comparison to prior art devices, since the solution as is defined above enables an increased number of different types of ropes, as well as different diameters of such ropes, to be used in conjunction with the system. This is in accordance to the present disclosure achieve by providing a rope securing arrangement, where the rope securing arrangement comprises a first and a second roller arranged to be comprised with an elongated lever, where the elongated lever in turn is hinged at a main body of the system.

When in the operational state of the system, the rope will engage with the first roller in such a manner that the hinged first elongated lever is, "moved" towards the rope grab, for example with a force being proportional to a carry load of the system. The second roller, being arranged closer to the hinged connection as compared to the first roller, will as a result be "pushed" towards the rope at a portion of rope grab, where the rope is engaging the rope grab.

The positioning of the second roller is dependent on a length of the elongated lever but may in some embodiments be positioned e.g. at 10-60% of a distance from the hinged connection to the main body. The overall length of the elongated lever may also be selected dependent on a desired pressure that the second roller is to provide for forcing the rope closer towards the rope grab.

Within the context of the application, the term roller should be interpreted broadly, and may comprise any type of device that can rotate "along with the rope" at the same time as the pressure is provided between the rope and the rope grab. Accordingly, the second roller should preferably be configured to provide a pressure that still allows the second roller to rotate when in the operational state (rotation of) the rope grab. It is desirable to also allow the first roller to rotate when in the operational state of the system. In an embodiment the rollers comprise bearings and/or bushings.

The robe grab may in one embodiment comprise a roller (may also be referred to as a rope pulley) formed to possibly pinch the rope by means of a concave form such as a v- or u-shaped rope engaging face, the rope engaging face formed at the "inside" of the roller for receiving the rope. The inside of the roller may additionally comprise a plurality of ridges for further increasing the friction between the rope and the roller.

As mentioned above, the motor is connected to the rope grab using the drive shaft. The expression "drive shaft" may include any mechanical implementation for transferring a rotational force from the motor to the rope grab. As such, the drive shaft may for example further include a gearbox or similar for adapting the rotational force to suit the rotational speed of the rope grab. The term rope is here used in its broader sense and is intended to include ropes, wires, belts, webbing, and cords of whatever nature or size suitable for engaging with the rope grab. As understood by this definition, the rope may have a circular, elliptic of essentially flat (e.g. rectangular) form.

Furthermore, the term "main body" should be understood to refer to e.g. a chassis for the portable system, providing support for the elements of the system as well as for mounting the elongated lever, etc.

In a preferred embodiment, the system further comprises a stopping arrangement configured to, when in the operational state, locking the elongated lever to the main body to minimizing a movement of the elongated lever in a direction parallel to the drive shaft. In some implementations this may be achieved by allowing the stopping arrangement to engage with a recess comprised with the elongated lever, the recess arranged in a vicinity of the second end of the elongated lever. That is, once the recess of the elongated lever engages with the stopping arrangement, the elongated lever may be seen as given a second "connection point", whereby the elongated lever may be locked from any movement in the direction parallel to the drive shaft. Accordingly, in case the hinge of the elongated lever allows the elongated lever to move in a first direction, the stopping arrangement ensures that no movement of the elongated lever is allowed in a direction perpendicular to the first direction.

In a possible embodiment of the present disclosure, the stopping arrangement connected to the main body at a position adjacently to the rope grab, the stopping arrangement comprising a heel portion partly extending into the rope engaging face of the rope grab to ensure that the rope, when in the operational state, remains at the first section of the circumference of the rope grab. An advantage following the introduction of the heel portion is that an increase security may be achieved, since the heal portion moves out of the rope grab at a predetermined position. Thus, the heal portion ensures that the rope does is not "reintroduced or re-circle" for a second turn around the rope grab, which in would result in an unwanted tangling of the rope. The stopping arrangement is preferably arranged directly adjacently to the rope grab.

In a possible embodiment of the present disclosure the stopping arrangement is adapted to limit the pressure to the rope towards the rope grab. Accordingly, the stopping arrangement may be mounted in relation to the rope grab such that the stopping arrangement engages with the elongated lever to limit its movement in a direction towards the rope grab. Thus, as a result the second roller being comprised with the elongated lever will (at a specific position) be stopped from moving towards the rope, whereby as a result the pressure exerted towards the rope in a direction towards the rope grab may be controlled. In an embodiment this may be achieved by mounting the stopping arrangement at a position where the second roller remains at least at a predetermined distance from the rope grab.

Preferably, the system further comprises a hinged lid configured to be arranged in a closed state to cover the rope grab when in the operational state of the system, and to be arranged in an opened state for allowing introduction of the rope to the robe grab. Such a lid minimizes any risks of the user introducing e.g. a hand or similar, efficiently increasing the operational safety of the system. The lid is preferably hinged connected to the main body In a possible embodiment, the lid comprises a control stud adapted to engage with the stopping arrangement when in the closed state. The control stud, similarly to the above discussion, ensures that a further connection point is provided, in the closed state, between the lid and the main body, in addition to the hinged connection between the lid and the main body. Accordingly, any unwanted movement in the hinged connection between the lid and the main body (e.g. perpendicular to the direction for opening and closing the lid) may be reduced.

In a possible embodiment the rope engaging face is provided with a plurality of pins configured to contact the rope along the section of the circumference of the rope grab engaging the rope when in the operational state of the rope grab arrangement. Preferably, a length of the pins is selected to not fully pierce through the rope. Preferably, the length is configured such that they engage themselves in the full woven part of rope, belt, strip or hanger, however with a minimum penetration of the "core" of the rope. The general structure of a rope suitable for use with a portable power-driven system as discussed above will be readily understood by the person skilled in the art.

Preferably, in one embodiment the pins are parallelly arranged in pairs along the circumference of the rope grab. Such an embodiment has shown promising for ensuring that a large plurality of different ropes may be successfully used in conjunction with the system.

In an embodiment, the rope grab and the pins are manufactured from a metal material, preferably keep as light as possible for reducing the overall weight of the power-driven system. However, within the concept of the invention, it may also be possible to manufacture the rope grab and/or the pins out of a resistant plastic material, such as for example being manufactured from a polyoxymethylene material. It is of course understood that other suitable plastic material having high resistance may be useable within the context of the invention.

The pins and the rope grab are preferably manufactured as a single unit. This may in some implementations be preferred due to cost of manufacturing. One possibility would for example be to manufacture the single unit rope grab using a milling process, such as a computer numerical control (CNC) milling process. Alternatively, the rope grab may be formed as one unit and the plurality of pins may be integrated with the rope grab, for example by insertion in holes formed at the engaging face of the rope grab.

Within the context of the invention, it may be possible to provide at least the engaging face of the rope grab with a rubber material or a similar equivalent, further improving the friction between the rope grab and the rope. The selection of material may be dependent on a possible temperature increase relating to the use of the additional e.g. rubber material when operating the portable power-driven system.

In a possible embodiment of the present disclosure the rope securing arrangement further comprises a spring mechanism for forcing the second roller towards the rope. The spring may be ensured that a "base pressure" is provided by the second roller for consistently, when in the operational state, pushing/forcing the rope towards the rope grab. Such a base pressure ensures that the rope grab may be allowed to drive the rope forwards/backwards also in situations where no anchoring force is provided to the system. Typically, if no base pressure is provided and/or the base pressure is selected too low, then there is a risk that the user will "fall" for a short distance downward a short distance until the function of the rope securing arrangement comes into function such that the rope engages with the rope grab with a desired level of friction.

As defined above, the system comprises a motor for rotating the rope grab. The motor may for example be one of an internal combustion engine or an electrical motor further comprising a rechargeable battery. The type of motor may be selected based on the application at hand, where both the internal combustion engine and the electrical motor provide advantages for different implementations.

Advantageously, the system further comprising a user interface for operating the motor for allowing rotation of the rope grab in a first and a second direction. The user interface may for example be implemented using e.g. a pair of buttons for controlling the rotational direction of the rope grab (and thus if the system should move “up or down”). More sophisticated solutions are however preferred, for example by using a rotatable handle that may be used for controlling both the direction and rotational speed of the robe grab (and thus the speed up or down).

In an embodiment of the invention there is further provided an elongated safety sling connected to the anchoring point, the safety sling arranged to receive at least one of a maillon, a carabiner, or a rigging plate. The sling may for example be of a textile material. The elongated sling is preferably at one of its ends connected to the anchoring point and configured to at its other end receive at least one of a maillon, a carabiner, or a rigging plate. The at least one of a maillon, a carabiner, or a rigging plate may then in turn be used for allowing connection of the portable system to e.g. a harness for a user, or for anchoring the system to a fixed structure using e.g. further climbing/fining equipment. The general term “elongated sling” is typically referred to as in relation to general climbing equipment. In addition, the term “textile” should be interpreted very broadly. For example, the textile material used for forming the sling may be of any type of e.g. woven or non-woven material, natural and/or synthetic fibers, etc.

When in the operational state of the portable power-driven system, the user is typically securely connected to the above discussed anchoring point, e.g. by means of the sling and carabiner.

Furthermore, preferably it is desirable to adapt the rope securing arrangement such that it is possible to, when in a none operational state of the portable power-driven system, allow a loop of the rope to be inserted between the first and the second roller when engaging the rope with the rope grab. This allows for the rope to be loaded e.g. at a mid-section of the length of the rope, as compared to prior-art solutions where a rope-end must be available when encircling and “loading” the rope grab.

Accordingly, as such it is desirable to ensure that the first and the second roller are separated with at least a distance set by the loop of the rope to be used with the portable power-driven system. Furthermore, it is preferred to ensure that hinged first elongated lever may be “lifted” away from the rope grab such that the loop may be extended in between side portions of and through the elongated lever to subsequently be allowed to engage with the rope grab.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
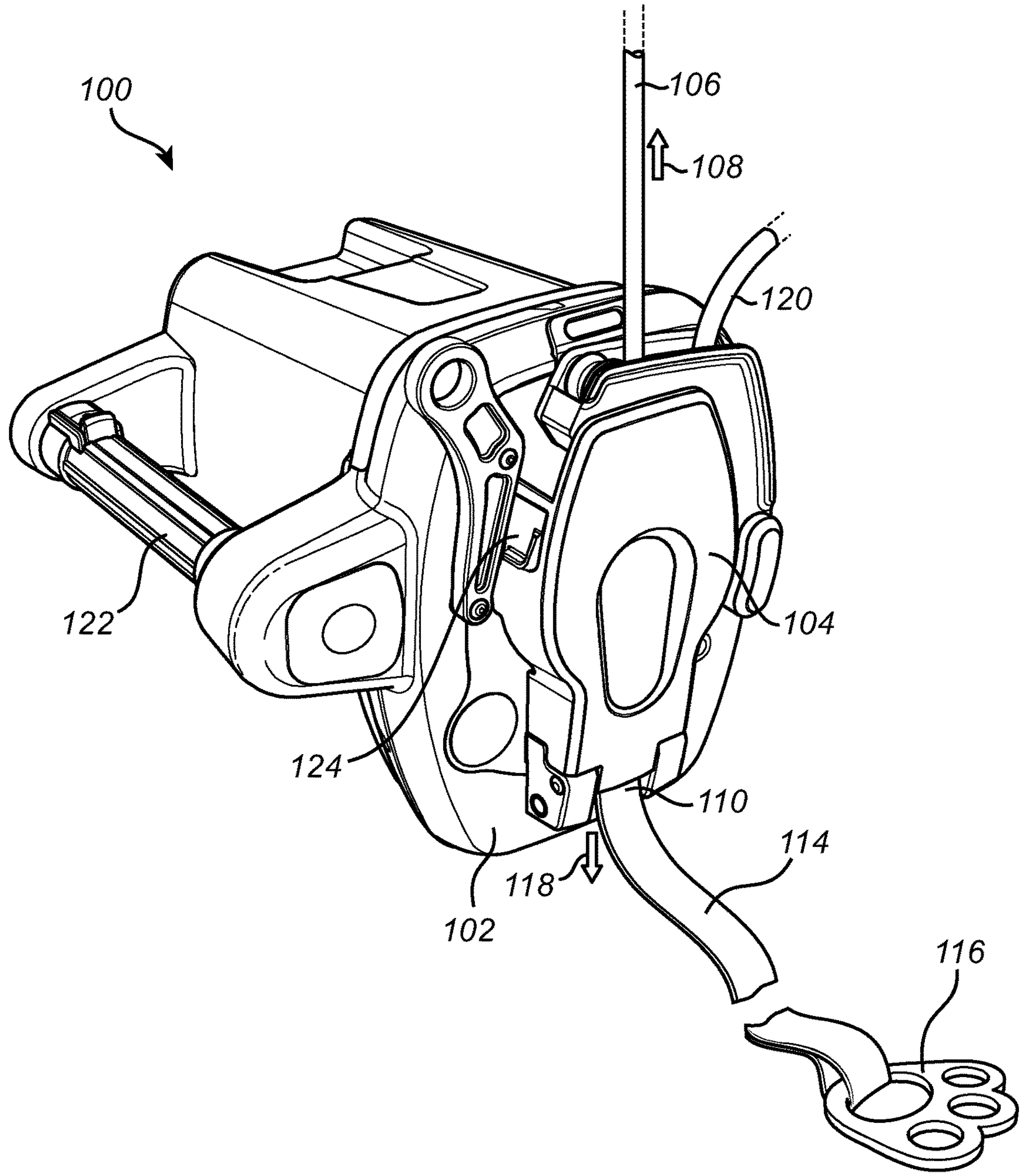
FIG. 1 shows a section of a portable power-driven system according to a currently preferred embodiment of the present disclosure.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 2:
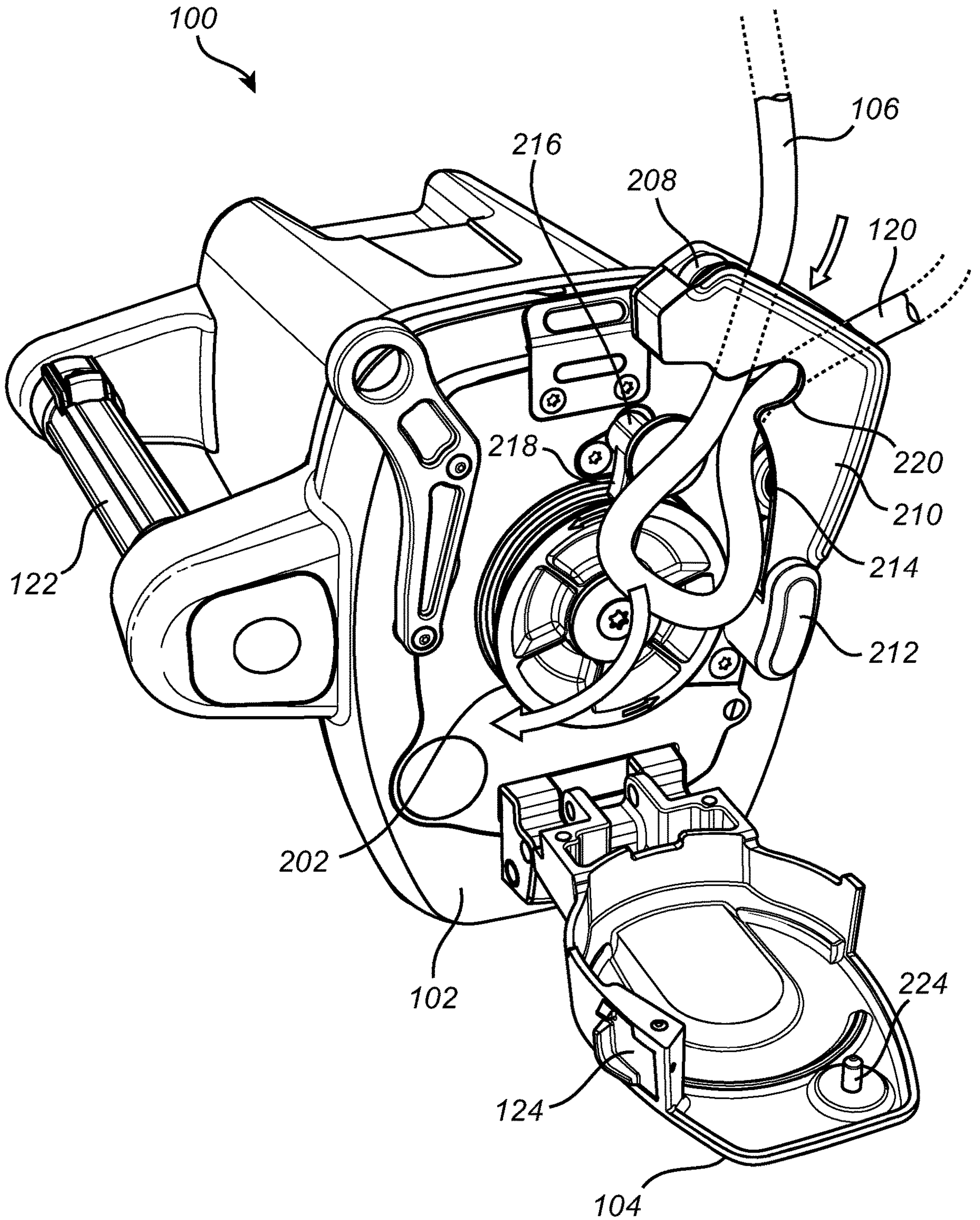
FIGS. 2-4 shows detailed views of the power-driven when loading a rope.

Referring now to the drawings and to FIGS. 1-2 in particular, there is depicted a portable power-driven system 100 according to a possible embodiment of the invention.

The power-driven system 100 comprises a motor 101 and a rope grab 202, the motor 101 and the rope grab 202 being connected to each other by means of for example a drive shaft 103 (possibly also including a gearbox or similar). The motor 101 is in the shown embodiment an electrical motor 101 further comprising a rechargeable battery 107, the rechargeable battery 107 possibly being removably attached to the system 100. In the illustrated embodiment the motor 101, the battery 107 and the drive shaft 103 are enclosed in a main body 102 of the system 100.

The system 100 further comprises a lid 104 for, when in the operational state, covering the rope grab 202, the rope grab 202 being configured for receiving and advancing a rope 106 once the motor 101 by means of the drive shaft 103 rotates the rope grab 202. The rope 106 is arranged to extend in a first main direction 108.

Preferably, the portable power-driven system 100 is configured to be waterproof.

Figure 3:
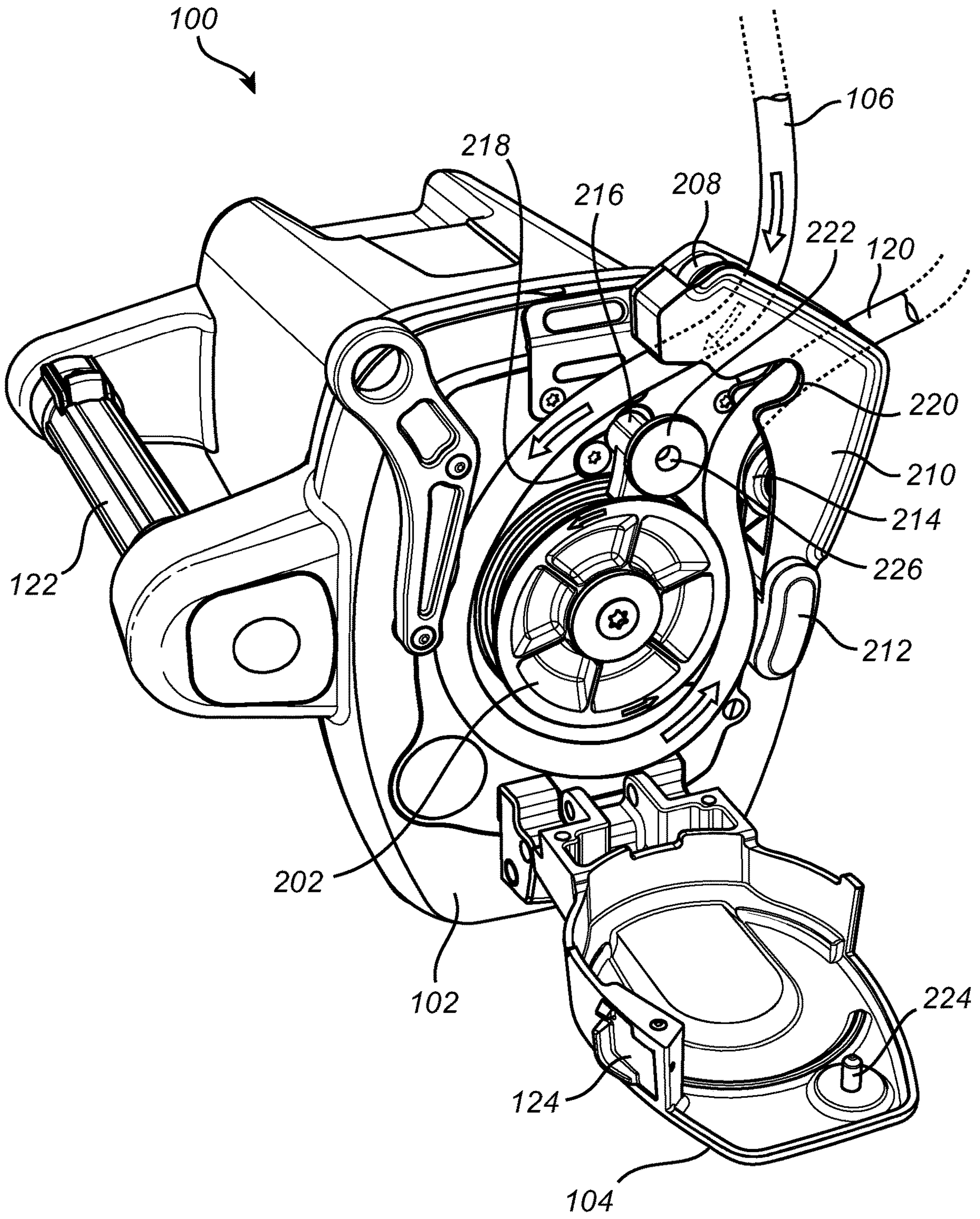

When in a non-operational state where the portable power-driven system 100 is prepared for subsequent operation, with further reference also to FIG. 3, a loop of the rope 106 is inserted to engage with a portion of the rope grab 202, typically being in contact with around half of the circumference of the rope grab 202. As exemplified in FIG. 3, the elongated lever 210 preferably comprises two side portions allowing the rope 106 to pass through within the elongated lever 210 and between the first 208 and the second roller 214. In FIG. 3 the rope grab 202 comprises a rope engaging face having a concave form, the concave form in some examples corresponding to a concave form of a capstan. However, the rope engaging face may have other forms depending on the implementation at hand, such as e.g. being essentially flat or essentially flat and provided with protrusions for engaging with the rope 106.

The rope 106 will as such engage and pass around a portion of a first roller 208. The first roller 208 is arranged at an elongated lever 210. The elongated lever 210 is in turned connected to the main body 102 using a hinge 212 at a first end of the elongated lever 210. The first roller 208 is arranged at an opposite second end of the elongated lever 210.

The elongated lever 210 is also provided with a second roller 214, arranged in between the first roller 208 and the hinge 212. The function of the second roller will be further discussed below. A spring mechanism 105 forces the second roller 214 towards the rope 106.

Furthermore, a load will be connected to an anchoring point 110 of the portable power-driven system 100, in the illustration coinciding with a hinge 112 of the lid 104. The anchoring point 110 may be provided with for example a sling 114 in turn connected to a maillon 116 for connecting to a harness of a user. The user will accordingly place a loading force 118 to the portable power-driven system 100, where the loading force 118 will extend in an essentially opposite direction as compared to the main direction 108 of the rope 106. The rope 106 will additionally have an unloaded end 120 extending out in a vicinity of the second roller 214.

Figure 4:
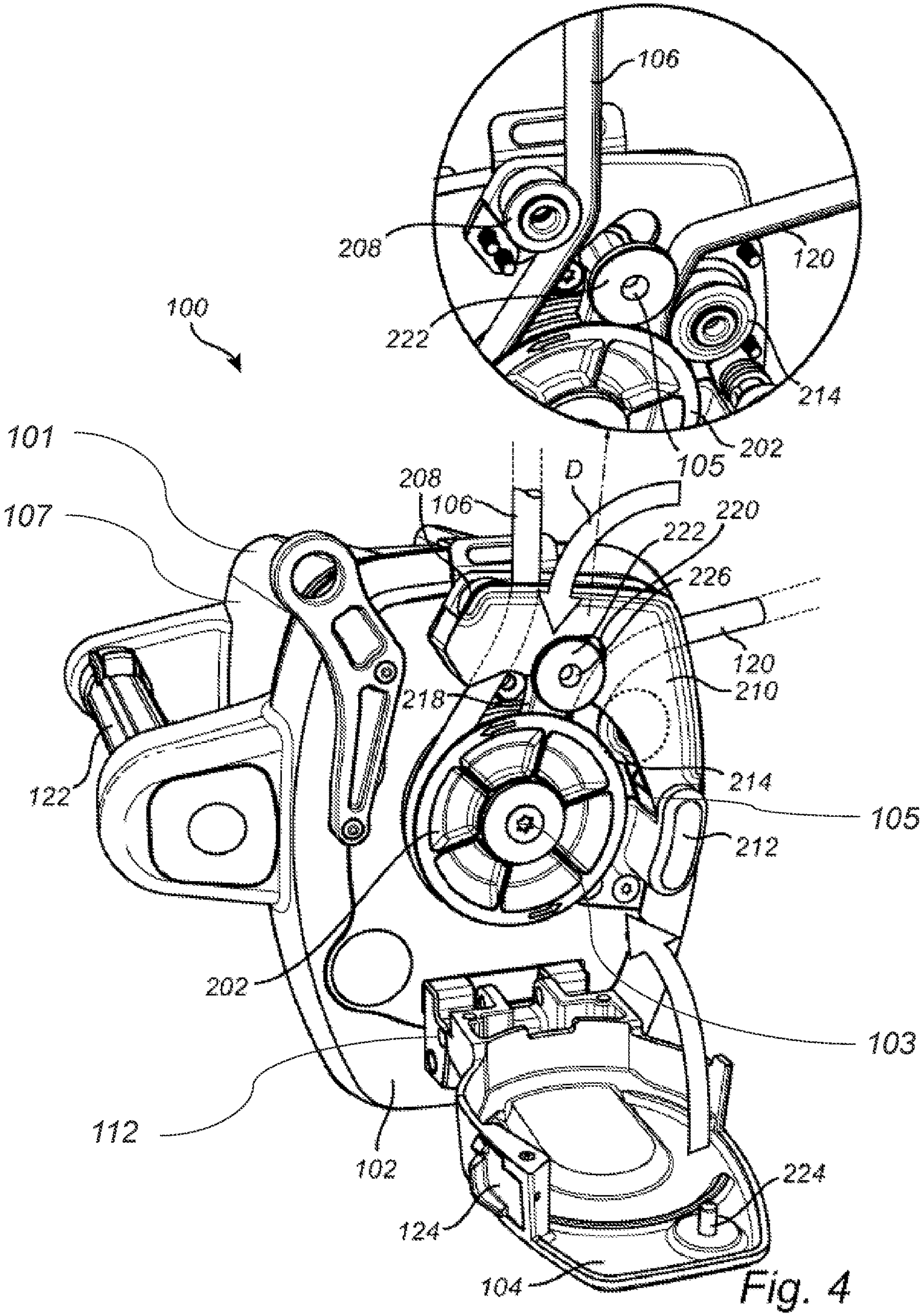

When applying the loading force 118 to the portable power-driven system 100, the rope 106 will force the elongated lever 210 to rotate in a direction D towards the rope grab 202 (at the hinge 212). As a result, as is further illustrated in FIG. 4, the second roller 214 will press a portion of the rope 106 towards the rope grab 202, such that the rope 106 is at least partly "clamped" between the second roller 214 and the rope grab 202. Clamping of the rope 106 between the second roller 214 and the rope grab 202 will increase a friction between the rope 106 and the rope grab 202. This will as a result allow for the use of a large variety of different types of ropes to be used with the portable power-driven system 100. In an embodiment, the second roller 214 may comprise a corresponding rope engaging face having e.g. one of a concave, a convex or a flat form.

Typically, a pressure inferred by the second roller 214 may be seen as proportional to the loading force 118. In some, but not all, embodiments it may be necessary to control this pressure. In the illustrations the system 100, this is achieved by further including a stopping arrangement 216, the stopping arrangement 216 being connected to the main body at a position adjacently to the rope grab 202. Preferably, a distance between the stopping arrangement 216 and the rope grab 202 is selected such that the rope 106 is not squashed between the second roller 214 and the rope engaging face of the rope grab 202.

Preferably, the stopping arrangement 216 further comprises a heel portion 218 partly extending into the rope engaging face of the rope grab 202 to ensure that the rope, when in the operational state is not allowed to re-circle the rope grab 202, a process that would result in an unwanted tangling of the rope 106 at the rope grab 202.

The stopping arrangement 216 may further be adapted to, when in the operational state of the system 100, engage with a recess 220 comprised with the elongated lever 210, the recess 220 arranged in a vicinity of the second end of the elongated lever 220. That is, once the recess 220 of the elongated lever 210 engages with the stopping arrangement 216, the elongated lever may be seen as given a second connection point in addition to the hinge 212, whereby the elongated lever 210 may be locked from any movement in the direction parallel to the drive shaft 103. Accordingly, the connection between the stopping arrangement 216 and the recess 220 of the elongated lever 210 ensures that no movement of the elongated lever 210 is allowed in a direction perpendicular to the regular direction D of moving the elongated lever 210 at the hinge 212. Securing the elongated lever 210 to the stopping arrangement 216 may be implemented using e.g. a disc 222.

Preferably, the lid 104 comprises a control stud 224 adapted to engage with an opening 226 of the stopping arrangement 216, when the lid 104 is in a closed state. The control stud 224 thereby ensures that a further connection point is provided, in the closed state, between the lid 104 and the main body 102, in addition to the hinge 112 of the lid 104. Accordingly, any unwanted movement in the hinge 112 (e.g. perpendicular to the direction for opening and closing the lid 104) may be reduced.

In addition, the system 100 may further comprise a user interface, in the illustrated embodiment implemented by means of a rotatable handle 122, for controlling the direction and rotational speed of the motor 101. Furthermore, the lid 104 may additionally comprise a locking/unlocking mechanism 124 for opening/closing the lid 104.

Still further, the system 100 may be equipped with a control unit (not shown) for controlling an operation of the motor 101, e.g. based on an input provided by the rotatable handle 122. The control unit may in some embodiments be connected to a sensor (not shown) provided for determine if the lid 104 is in the closed or an open state. Such a sensor may for example be a magnetic sensor. In some embodiments, the system 100 may not be allowed to be operated if the lid 104 is in the open state.

Figure 5A:
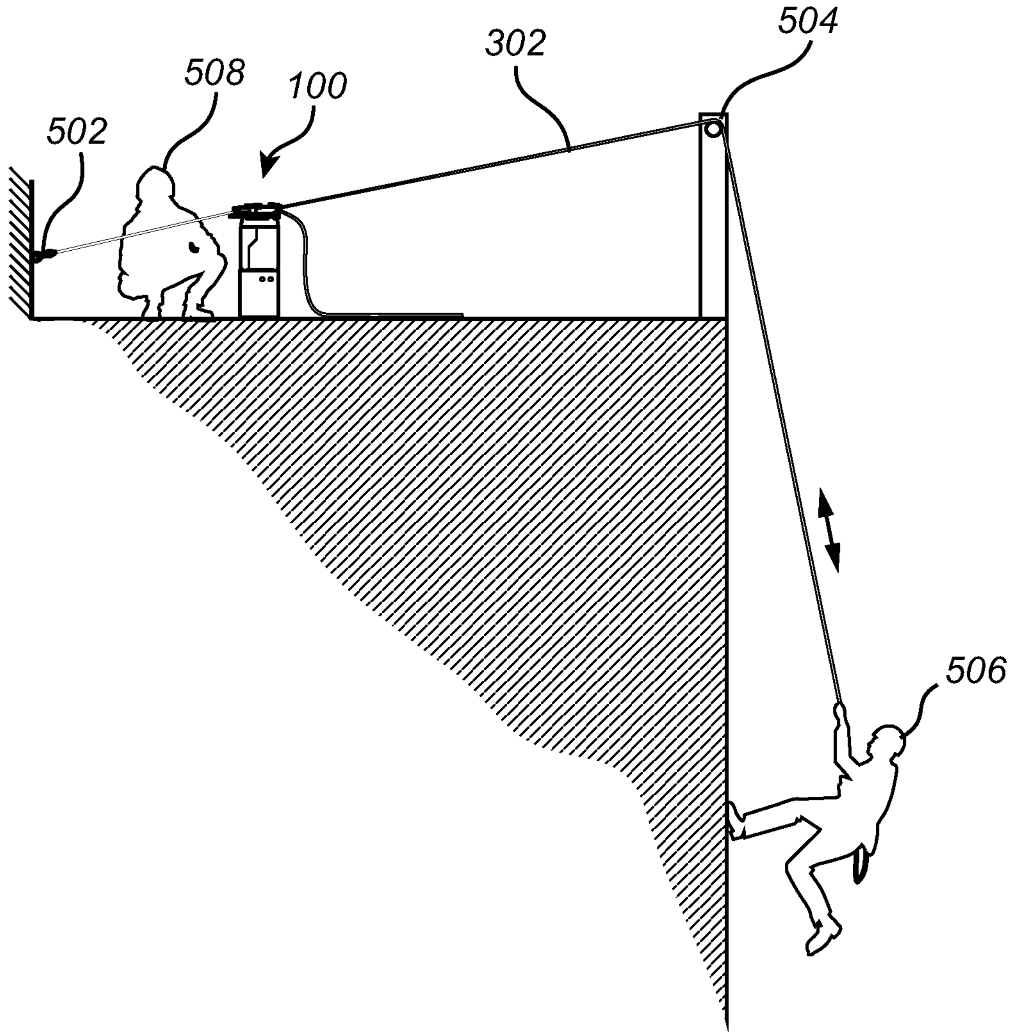
FIGS. 5A and 5B illustrates horizontal and vertical operations for the power-driven system as shown in FIGS. 1-4.
Figure 5B:

Turning now to FIGS. 5A and 5B, which illustrates exemplary horizontal and vertical operations, respectively, of the power-driven system 100. In the embodiment of FIG. 5A, the system 100 is arranged as a standalone winch mode, i.e. instead of the user connecting his/her safety harness directly to the anchoring point 110 and using the system 100 to ascend/descend along the rope 302, the system 100 is in this mode connected to a fixed structure 502 such as a wall or similarly available object at the operational site.

In the illustrated example, the rope 302 is configured to pass over e.g. a roller 504 for the purpose of allowing a user 506 to be transported in a vertical manner without having to himself control the system 100. The system may instead (or also) be controlled by an operator 508 using the user interface, the operator 508 typically situated adjacently to the system 100. It may however be possible to configure the system 100 to additionally comprise means to be controlled from a distance, for example by means of a remote control (wired or wireless, not shown). Preferably, the control is wireless and in such an implementation the system 100 comprises wireless connection means to communicate wirelessly with the remote control.

In FIG. 5B, the typical vertical operation scenario for the power-driven system 100 is shown. In this scenario, the user 506 having a safety harness is typically connected to the sling 114. The rope 106 will in this case typically be arranged at a position above the user 506 (sometimes in relation to climbing denoted as "top rope"). In some possible scenarios of operation of the system 100, the fixed top rope position above the user 506 may be somewhat flexibly arranged, for example by means of a rope launcher, a pole or any type of tactical hooks.

In summary, a portable power-driven system for advancing a rope, with the rope extending in a first main direction, comprises a motor comprising a drive shaft, a rope grab connected to the drive shaft, the rope grab comprises a rope engaging face having a concave form adapted to, when in the operational state, engage the rope along a first section of a circumference of the rope grab, and a main body for mounting the motor and further comprising an anchoring point adapted to receive an anchoring force, the anchoring force extending in a second direction being essentially opposite to the first main direction, wherein the power-driven system further comprises a rope securing arrangement, the securing arrangement comprising an elongated lever at a first end having a hinged connection to the main body and at a second end configured to receive a first roller adapted to, when in the operational state, engage with the rope, and the rope securing arrangement is adapted to, by means of a second roller comprised with the elongated lever, exert a pressure to the rope for forcing the rope towards the rope grab at a portion of the first section where the rope, when in the operational state, is engaging the rope grab.

The invention is based on the understanding that the operation of the portable power-driven system may be simplified in comparison to prior art devices, since the solution as is defined above enables an increased number of different types of ropes, as well as different diameters of such ropes, to be used in conjunction with the system. This is in accordance to the present disclosure achieve by providing a rope securing arrangement, where the rope securing arrangement comprises a first and a second roller arranged to be comprised with an elongated lever, where the elongated lever in turn is hinged at a main body of the system.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word “comprising” does not exclude other elements or steps, and the indefinite article “a” or “an” does not exclude a plurality.

The invention claimed is:

1. A portable power-driven system for advancing a rope, the rope extending in a first main direction, the power-driven system comprising:

a motor comprising a drive shaft;

a rope grab connected to and aligned with the drive shaft, the rope grab comprises a rope engaging face adapted to, when in an operational state, engage the rope along a first section of a circumference of the rope grab;

a main body for mounting the motor and further comprising an anchoring point adapted to receive an anchoring force, the anchoring force extending in a second direction being essentially opposite to the first main direction;

a rope securing arrangement comprising an elongated lever defining a recess, the elongated lever at a first end having a hinged connection to the main body and at a second end configured to receive a first roller adapted to, when in the operational state, engage with the rope, wherein the rope securing arrangement is adapted to, by means of a second roller comprised with the elongated lever, exert a pressure to the rope for forcing the rope towards the rope grab at a portion of the first section where the rope, when in the operational state, is engaging the rope grab; and a stopping member connected to the main body adjacent the rope grab and configured to, when in the operational state, lock the elongated lever to the main body to minimize a movement of the elongated lever in a direction parallel to the drive shaft, wherein the stopping member is between the first roller and the second roller in the operational state and engages with the recess of the elongated lever to limit its movement in a direction towards the rope grab; and wherein the elongated lever comprises two side portions allowing the rope to pass through within the elongated lever and between the first roller and the second roller in the operational state, wherein the anchoring force is configured to rotate the elongated lever towards the rope grab, and wherein the pressure exerted to the rope by the second roller is proportional to the anchoring force and limited by the stopping member.

2. The system according to claim 1, wherein the stopping member comprises a heel portion partly extending into the rope engaging face of the rope grab to ensure that the rope, when in the operational state, remains at the first section of the circumference of the rope grab.

3. The system according to claim 2, wherein the stopping member is arranged to ensure, when in the operational state, that the second roller remains at least at a predetermined distance from the rope grab.

4. The system according to claim 1, wherein the stopping member is adapted to limit the pressure to the rope towards the rope grab.

5. The system according to claim 1, further comprising a lid adapted to be arranged in one of an open or a closed state, wherein the lid in the closed state is adapted to cover the rope grab.

6. The system according to claim 5, wherein the lid is hingedly connected to the main body.

7. The system according to claim 5, wherein the lid comprises a control stud adapted to engage with the stopping member when in the closed state.

8. The system according to claim 1, wherein the stopping member is arranged directly adjacently to the rope grab.

9. The system according to claim 1, wherein the rope engaging face is provided with a plurality of pins configured to contact the rope along the first section of the circumference of the rope grab engaging the rope when in the operational state of the rope grab arrangement.

10. The system according to claim 9, wherein the pins are parallelly arranged in pairs along the circumference of the rope grab.

11. The system according to claim 9, wherein the rope grab and the pins are manufactured from a metal material.

12. The system according to claim 9, wherein the rope grab and the pins are manufactured as a single unit.

13. The system according to claim 1, wherein the rope securing arrangement further comprises a spring mechanism for forcing the second roller towards the rope.

14. The system according to claim 13, wherein the spring mechanism is arranged to ensure that the second roller is consistently, when in the operational state, forced with at least a predetermined minimum base force towards the rope.

15. The system according to claim 1, wherein the motor is at least one of an internal combustion engine or an electrical motor further comprising a rechargeable battery.

16. The system according to claim 1, further comprising a user interface for operating the motor for allowing rotation of the rope grab in a first and a second direction.

17. The system according to claim 1, further comprising a safety sling connected to the anchoring point, the safety sling arranged to receive at least one of a maillon, a carabiner, or a rigging plate.

18. The system according to claim 1, wherein the rope securing arrangement is adapted for, when in a non-operational state, allowing a loop of the rope to be inserted between the first and the second roller when engaging the rope with the rope grab.

* * * * *